US010656093B2

(12) United States Patent
Barcelo et al.

(10) Patent No.: US 10,656,093 B2
(45) Date of Patent: May 19, 2020

(54) STRUCTURES FOR SURFACE ENHANCED RAMAN

(71) Applicant: Hewlett-Packard Development Company, L.P., Fort Collins, CO (US)

(72) Inventors: Steven Barcelo, Palo Alto, CA (US); Ning Ge, Palo Alto, CA (US); Zhiyong Li, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 169 days.

(21) Appl. No.: 15/569,767

(22) PCT Filed: Jul. 20, 2015

(86) PCT No.: PCT/US2015/041125
§ 371 (c)(1),
(2) Date: Oct. 27, 2017

(87) PCT Pub. No.: WO2017/014739
PCT Pub. Date: Jan. 26, 2017

(65) Prior Publication Data
US 2018/0136135 A1    May 17, 2018

(51) Int. Cl.
*G01J 3/44* (2006.01)
*G01N 21/65* (2006.01)

(52) U.S. Cl.
CPC .............. *G01N 21/658* (2013.01); *G01J 3/44* (2013.01)

(58) Field of Classification Search
CPC .................................. G01J 3/44; G01N 21/658
USPC ........................................................ 356/301
See application file for complete search history.

(56) References Cited

U.S. PATENT DOCUMENTS

| 7,864,313 | B2 | 1/2011 | Baumberg et al. |
| 8,810,788 | B2* | 8/2014 | Li ........................ B82Y 30/00 356/301 |
| 9,019,494 | B2 | 4/2015 | Lin et al. |
| 2005/0105085 | A1 | 5/2005 | Naya |
| 2007/0285657 | A1 | 12/2007 | Wang et al. |
| 2008/0093217 | A1 | 4/2008 | Wu et al. |
| 2009/0014704 | A1* | 1/2009 | Chen ........................ B82Y 10/00 257/3 |
| 2009/0213369 | A1* | 8/2009 | Lee ........................ B82Y 5/00 356/301 |
| 2011/0181878 | A1 | 7/2011 | Parng et al. |
| 2011/0267607 | A1 | 11/2011 | Hu et al. |
| 2011/0267608 | A1* | 11/2011 | Ou ........................ G01N 21/658 356/301 |

(Continued)

FOREIGN PATENT DOCUMENTS

| CN | 103257131 | 8/2013 |
| CN | 103712972 | 4/2014 |

(Continued)

OTHER PUBLICATIONS

Cui, B. et al., Fabrication of Large Area Nanoprism Arrays and Their Application for Surface Enhanced Raman Spectroscopy, (Research Paper), Apr. 9, 2008.

(Continued)

*Primary Examiner* — Sunghee Y Gray
(74) *Attorney, Agent, or Firm* — Dierker & Kavanaugh PC (57) ABSTRACT

In one example, a structure for surface enhanced Raman spectroscopy includes a cluster of metal nanoparticles in a hole.

8 Claims, 8 Drawing Sheets

(56) References Cited

U.S. PATENT DOCUMENTS

| | | | |
|---|---|---|---|
| 2012/0182550 A1 | 7/2012 | Tang et al. | |
| 2012/0281213 A1* | 11/2012 | Tyler | B82Y 30/00 356/301 |
| 2013/0252275 A1* | 9/2013 | Tokonami | G01N 21/554 435/29 |
| 2014/0178593 A1* | 6/2014 | Ren | C23C 24/085 427/450 |
| 2015/0002842 A1* | 1/2015 | Kim | G01N 1/28 356/301 |
| 2015/0049332 A1 | 2/2015 | Sun et al. | |
| 2015/0077743 A1* | 3/2015 | Maznichenko | G01J 3/44 356/301 |
| 2015/0214394 A1* | 7/2015 | Huang | H01L 31/02363 136/255 |
| 2016/0033415 A1* | 2/2016 | Meinhart | G01N 21/05 435/34 |

FOREIGN PATENT DOCUMENTS

| | | | | |
|---|---|---|---|---|
| CN | 104730059 | * | 6/2015 | G01N 21/65 |
| ES | 2502665 | | 10/2014 | |
| TW | 201126148 A | | 8/2011 | |
| TW | 201403053 A | | 1/2014 | |
| WO | WO-2010081088 | | 7/2010 | |
| WO | WO-2010104520 | | 9/2010 | |

OTHER PUBLICATIONS

Perney, N.M.B., Tuning Localized Plasmons in Nanostructured Substrates for Surface-enhanced Raman Scattering, (Research Paper), 2006.

Xu, Z. et al., Nanoreplicated Positive and Inverted Submicrometer Polymer Pyramid Array for Surface-enhanced Raman Spectroscopy, (Research Paper), Nov. 28, 2011.

Zhang, Q. et al., Hierarchical 3D SERS Substrates Fabricated by Integrating Photolithographic Microstructures and Self-Assembly of Silver Nanoparticles, (Research Paper), Mar. 10, 2014.

Alexander, K.D. et al: "A high-throughput method for controlled hot-spot fabrication in SERS-active gold nanoparticle dimer arrays", Journal of Raman Spectroscopy, vol. 48, No. 12, 21 Aug. 2889 (2889-88-21), pp. 2171-2175.

Zhang C. et al: "SERS detection of low-concentration adenosine by silver nanoparticles on silicon nanoporous pyramid arrays structure", Applied Surface Science, Elsevier, Amsterdam, NL, vol. 347, 2 May 2815 (2815-85-82), pp. 668-672.

Tian, Furong et al. "Surface enhanced Raman scattering with gold nanoparticles: effect of particle shape." Analytical Methods 6, No. 22 (2014): 9116-9123.

* cited by examiner

STRUCTURES FOR SURFACE ENHANCED RAMAN

BACKGROUND

Surface Enhanced Raman Spectroscopy (SERS) is a surface-sensitive technique that enhances Raman scattering by molecules adsorbed on rough metal surfaces or nanostructures.

DRAWINGS

The same part numbers designate the same or similar parts throughout the figures. The figures are not necessarily to scale.

DESCRIPTION

Metal nanoparticle structures can provide substantial surface enhancement for SERS. However, reliably fabricating metal nanoparticle structures that provide repeatable strong surface enhancement may present difficult challenges. The new metal nanoparticle structures provided herein have been developed for SERS to help provide repeatable strong surface enhancement with less difficult fabrication. In one example, the new structure includes a cluster of metal nanoparticles in a hole in the surface of a silicon or other suitable SERS substrate. A "cluster" of nanoparticles as used in this document means a three dimensional group of nanoparticles that are close together. (A single layer of nanoparticles is not a "cluster".) A SERS structure may include a single hole with clustered nanoparticles or an array of holes each with clustered nanoparticles. In one specific implementation, the hole is tapered and filled with a nanoparticle cluster having fewer nanoparticles across the bottom, narrower part of the hole and more nanoparticles across the top, broader part of the hole.

Three dimensional nanoparticle assemblies formed by clustering nanoparticles in holes in the surface of a SERS substrate may be desirable in many SERS applications to provide multiple orientations of coupled nanoparticles. SERS enhancement is strengthened when light interacts with neighboring nanoparticles in such a way that the polarization of the light is aligned to a dipole axis of the nanoparticles. Multiple dipole orientations increase the potential for incoming light to favorably interact with the nanoparticle clusters for a strong SERS signal.

The holes may be formed in a silicon or other suitable SERS substrate, for example, with photolithographic masking and etching techniques used in semiconductor fabrication. In one example, the nanoparticles are allowed to self-assemble into clusters conforming to the shape of each hole by drawing a thin film solution containing metal nanoparticles slowly across the surface of a holey substrate. The rate at which the solvent evaporates from the solution may be controlled so that the nanoparticles preferentially assemble in the holes and not on the surface areas surrounding the holes.

These and other examples shown and described herein illustrate but do not limit the scope of the patent, which is defined in the Claims following this Description.

Figure 1:
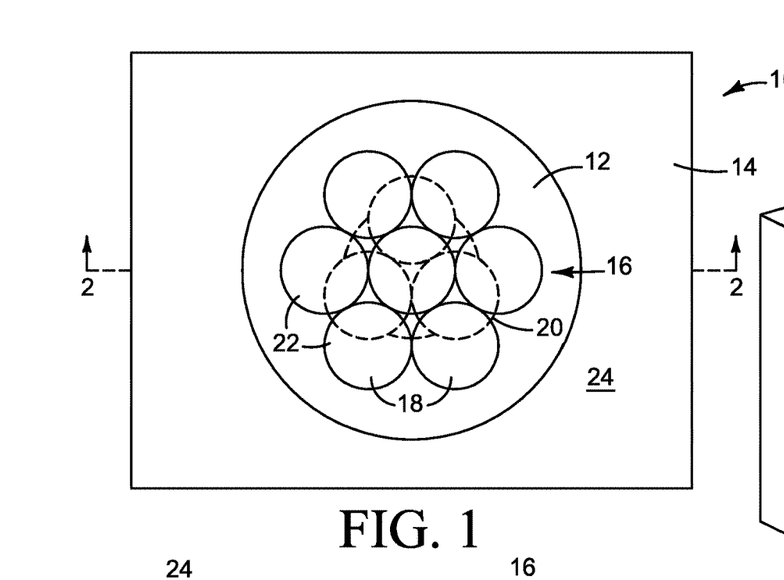
FIGS. 1-3 illustrate an example of a SERS structure, in which ten metal nanoparticles are clustered in two layers in a single cone shaped hole.
Figure 2:
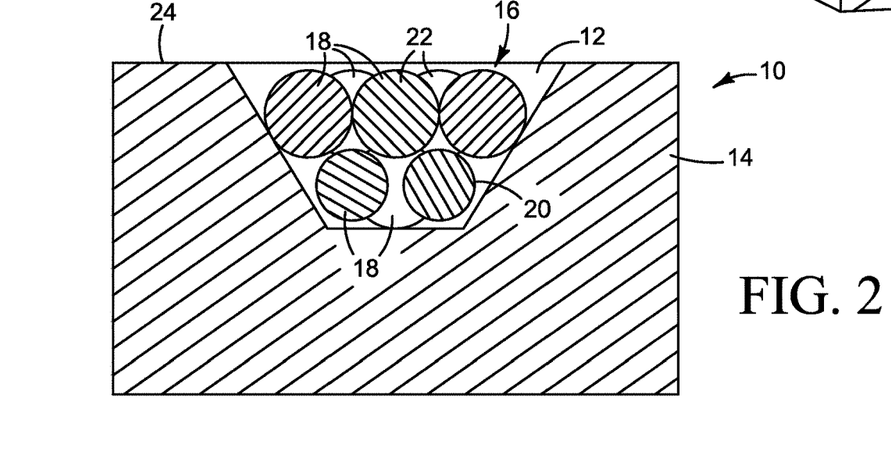
Figure 3:
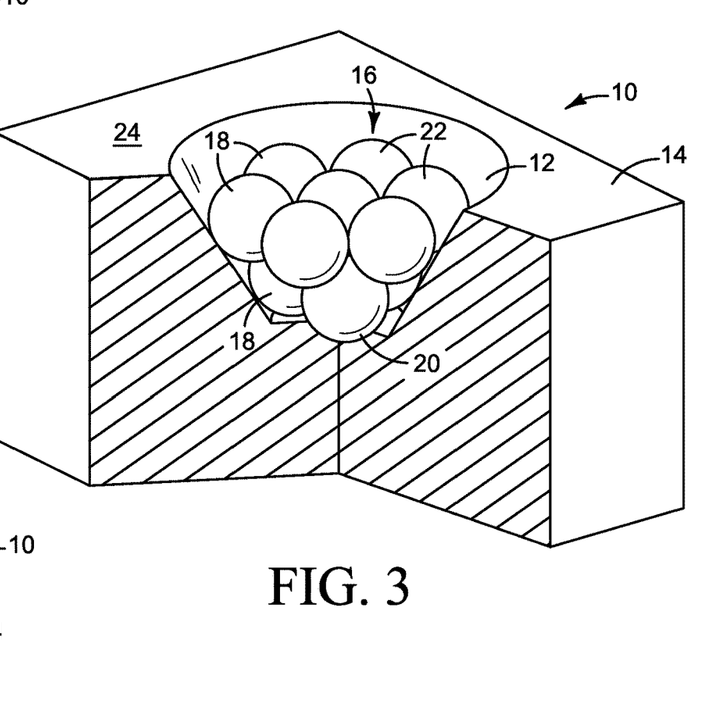

FIGS. 1-3 illustrate one example of a structure 10 for SERS. The plan view of FIG. 1 illustrates a structure 10 with a single hole 12 in a silicon or other suitable SERS substrate 14. Referring to FIGS. 1-3, structure 10 includes a cluster 16 of metal nanoparticles 18 in hole 12. In the example shown, hole 12 is tapered in the shape of a truncated cone. A correspondingly tapered cluster 16 includes fewer nanoparticles 18 in a narrower part of hole 12 and more nanoparticles 18 in a broader part of hole 12. Also, in this example, hole 12 and nanoparticles 18 are configured with respect to one another such that a total of ten nanoparticles 18 fill hole 12 in two layers 20, 22—three nanoparticles 18 in bottom layer 20 and seven nanoparticles 18 in top layer 22.

Strong SERS enhancement results when light interacts with neighboring nanoparticles in such a way that the polarization of the light is aligned to a dipole axis of the nanoparticles. In one example, because it is difficult to control the polarization of incoming light without filtration, the larger range of dipole orientations provided by a three dimensional nanoparticle assembly such as cluster 16 may increase the potential for incoming light to favorably interact with the nanoparticles to generate a strong SERS signal. Consequently, a nanoparticle cluster 16 may help reduce the dependence of surface enhancement on the polarization/incidence angle of the incoming light, allowing a more flexible SERS structure design with fewer criteria to be satisfied by the excitation source. In addition, the sidewalls of a tapered hole 12 reflect incident light at an angle to the collections optics, rather than directly back into the collection optics. Collection optics usually share some components with the excitation path and, therefore, filters are used to remove a stronger laser signal to better detect a weaker Raman signal. By reflecting the laser signal away from the collection optics, the use of filters may be reduced, allowing more simple and thus less expensive collection optics.

Suitable metals for SERS nanoparticles 18 include gold (Au), silver (Ag), copper (Cu) and other such plasmon supporting metals. "Metal" as used in this document includes elemental metals, metal alloys and metal compounds suitable for use in SERS. Although spherical nanoparticles 18 are shown, other particle shapes may be used, including randomly shaped particles. A "nanoparticle" as used in this document means a particle with at least one dimension in the range of 10 nm to 200 nm.

As discussed below with reference to FIGS. 16-23, nanoparticles 18 may be processed to self-assemble in a cluster 16 conforming to the shape of hole 12 and not on surface 24 surrounding hole 12. Hole 12 may be sized and shaped to cluster nanoparticles 18 in the desired configuration, for example a two layer cluster 16 of ten nanoparticles 18 shown in FIGS. 1-3.

Figure 4:
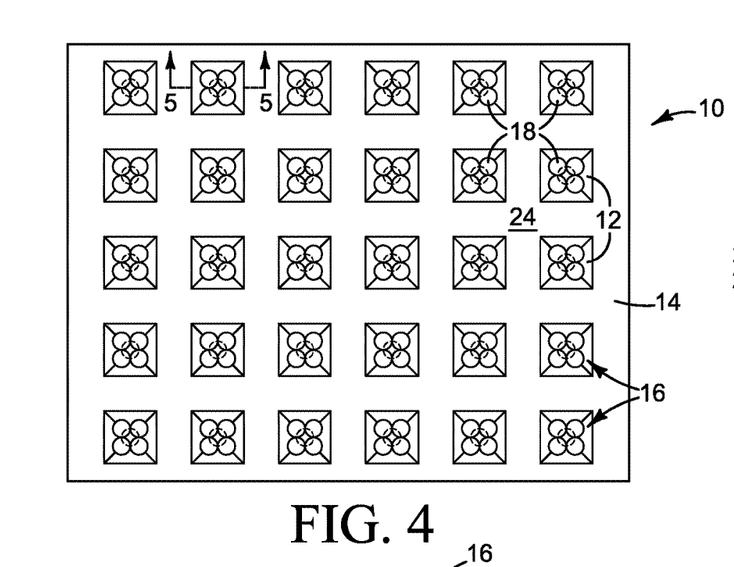
FIGS. 4-6 illustrate an example of a SERS structure, in which five metal nanoparticles are clustered in two layers in multiple square-base pyramid shaped holes.
Figure 5:
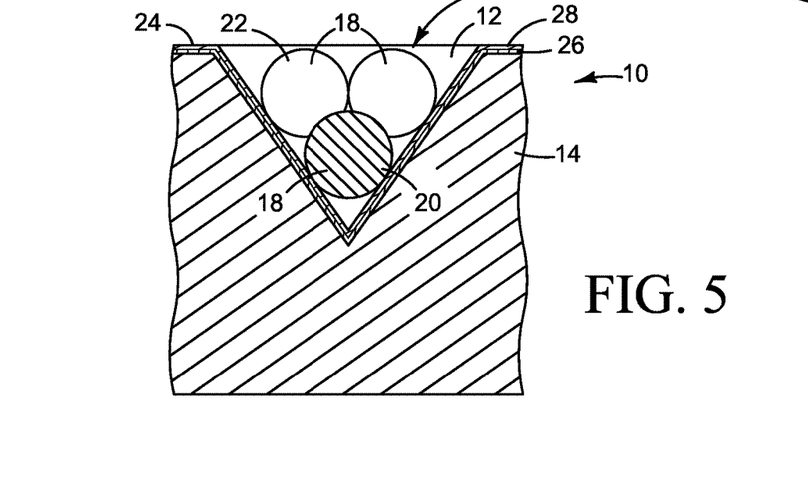
Figure 6:
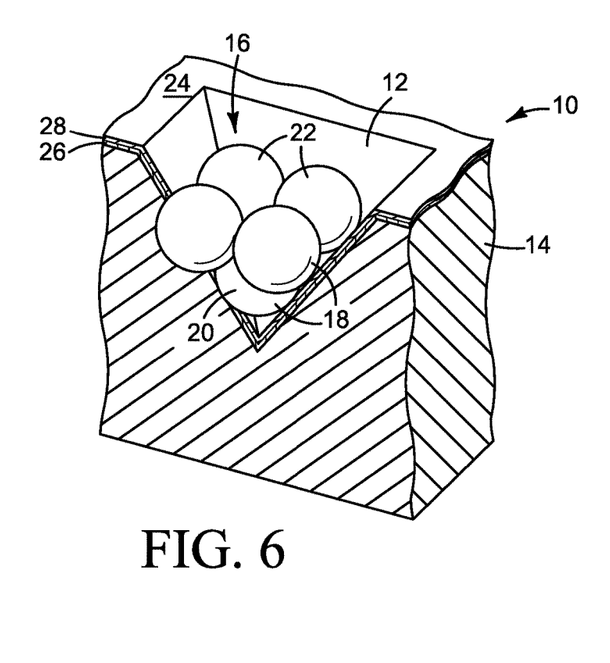

In another example, shown in FIGS. 4-6, structure 10 includes multiple square-base pyramid shaped holes 12 each sized to contain a two-layer cluster 16 of five nanoparticles. A multiple hole SERS structure 10 such as that shown in FIG. 4 may be desirable, for example, to enable illuminating multiple holes within a single laser spot, enhancing the SERS signal, and functionalizing each hole (or neighboring group of holes) differently so that different analytes from a single sample can be measured on one chip. Also, in this example, each hole 12 is lined with gold or another suitably reflective material 26 to scatter incoming light back through nanoparticle cluster 16 for a larger interaction volume. Because Raman scattering is mostly non-directional, a reflective lining 26 can also serve to direct more of the Raman scattering photons back toward the collection optics. Both factors may help structure 10 produce a greater Raman signal from a weaker laser, which is favorable for a portable sensing solution where a low cost detection system is desirable. A metal lining 26 may be coated with silicon oxide, silicon nitride or another suitable dielectric 28 to prevent an electrical connection between the reflective metal lining 26 and metal nanoparticles 18.

Figure 7:
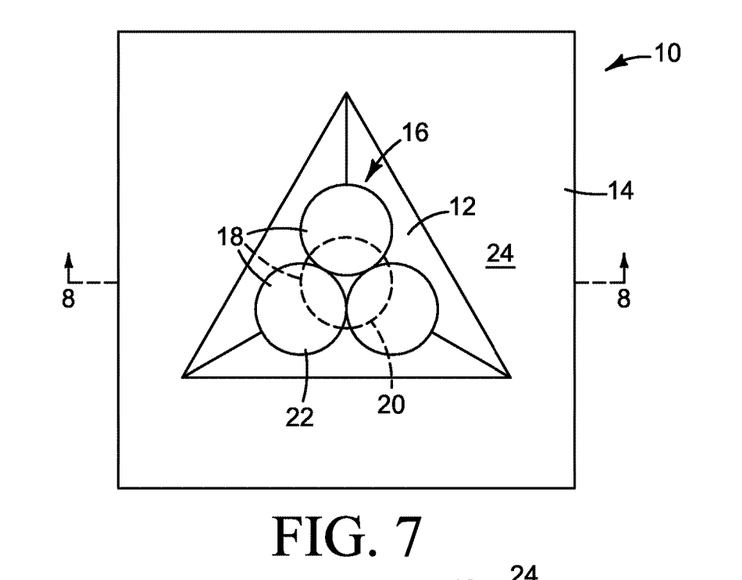
FIGS. 7-9 illustrate an example of a SERS structure, in which four metal nanoparticles are clustered in two layers in a single triangle-base pyramid shaped hole.
Figure 8:
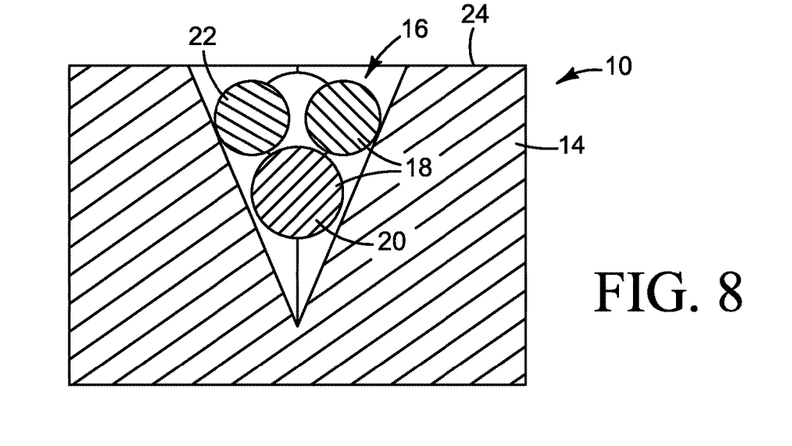
Figure 9:
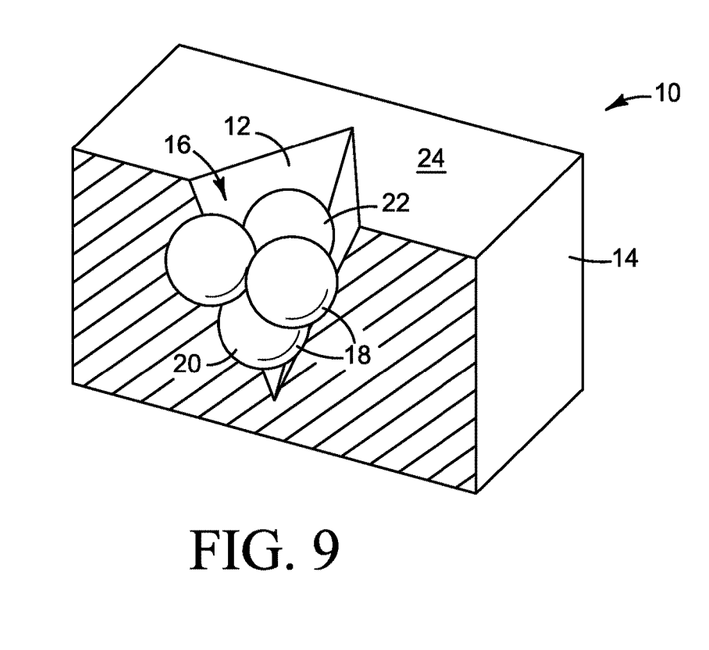

In another example, shown in FIGS. 7-9, structure 10 includes a triangle-base pyramid shaped hole 12 sized to contain a two-layer cluster 16 of four nanoparticles.

Figures 10, 11, 12:
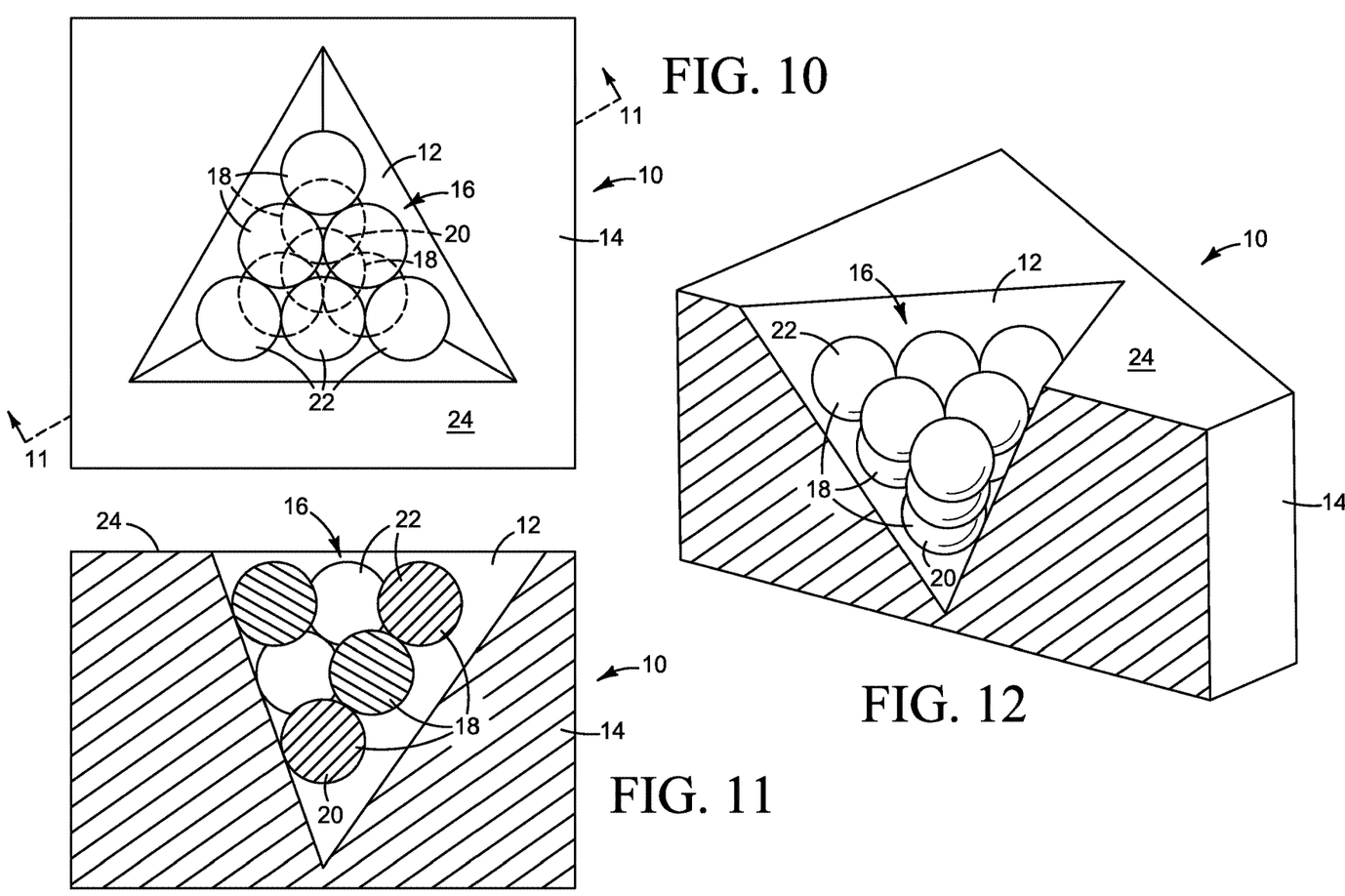
FIGS. 10-12 illustrate an example of a SERS structure, in which ten metal nanoparticles are clustered in three layers in a single triangle-base pyramid shaped hole.

In another example, shown in FIGS. 10-12, structure 10 includes a triangle-base pyramid shaped hole 12 sized to contain a three-layer cluster 16 of ten nanoparticles.

Figures 13, 14, 15:
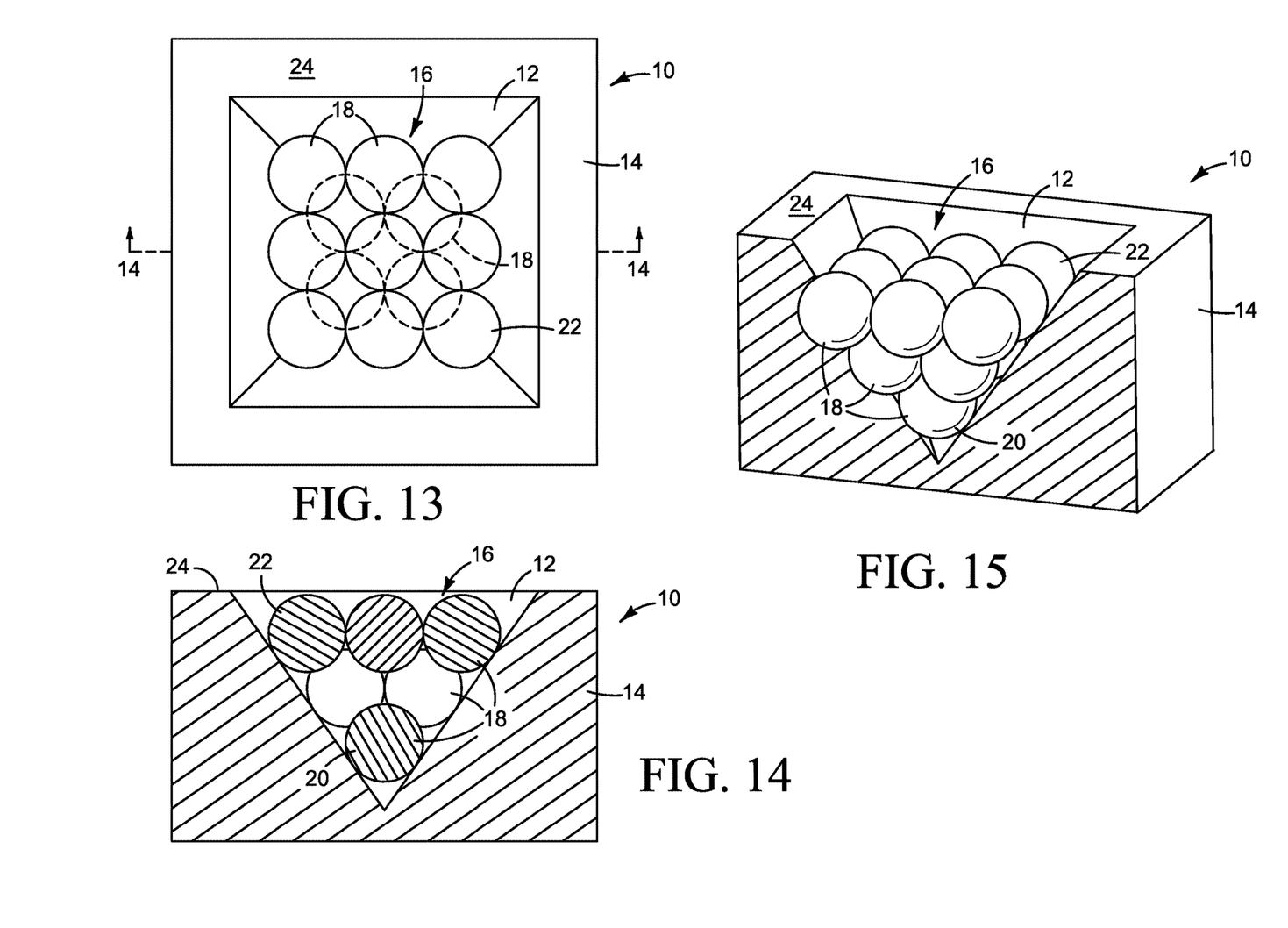
FIGS. 13-15 illustrate an example of a SERS structure, in which fourteen metal nanoparticles are clustered in three layers in a single square-base pyramid shaped hole.

In another example, shown in FIGS. 13-15, structure 10 includes a square-base pyramid shaped hole 12 sized to contain a three-layer cluster 16 of fourteen nanoparticles.

Although the number of nanoparticles 18 in a cluster 16 may vary, it is expected that a cluster 16 with fewer than three nanoparticles 18 or a cluster 16 with more than ten nanoparticles 18 across the top (broadest part) of a hole 12 will not be effective to help improve surface enhancement. Other suitable shapes for a hole 12 are possible and, while it is expected that a SERS structure 10 with clustered nanoparticles 18 usually will be implemented with tapered holes 12 to achieve the desired surface enhancement, it may be possible to use holes with parallel walls (not tapered) effectively in some implementations.

Figure 16:
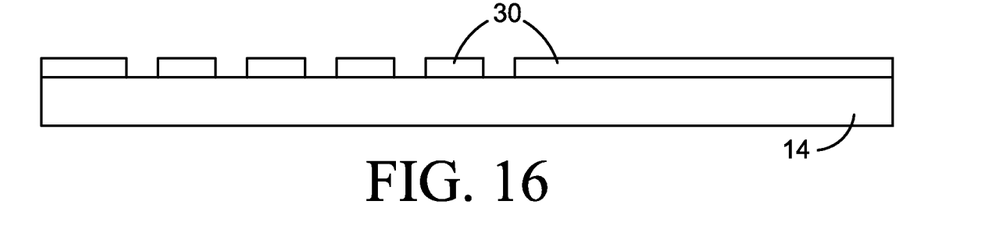
FIGS. 16-23 present a sequence of views illustrating one example of a process for fabricating a SERS structure, such as a SERS structure shown in FIGS. 1-3, 4-6, 7-9, 10-12 and 13-15.
Figure 17:
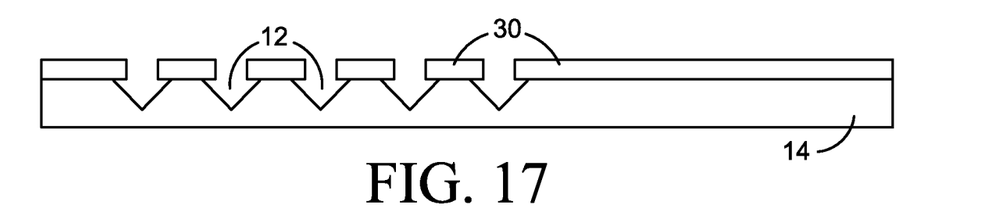
Figure 18:
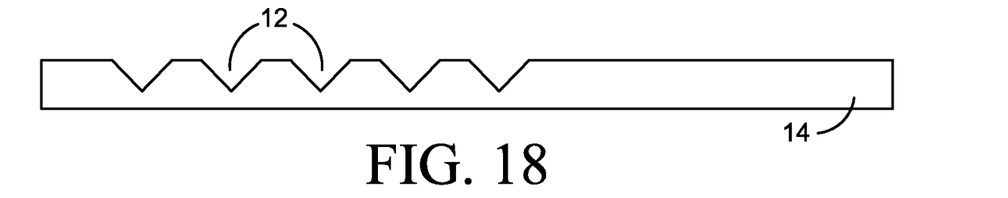
Figure 22:
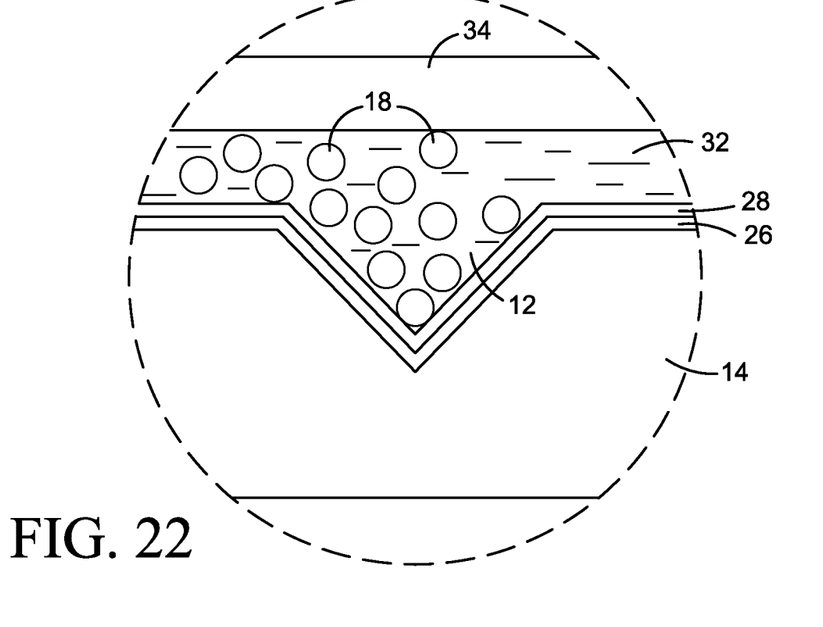
Figure 23:
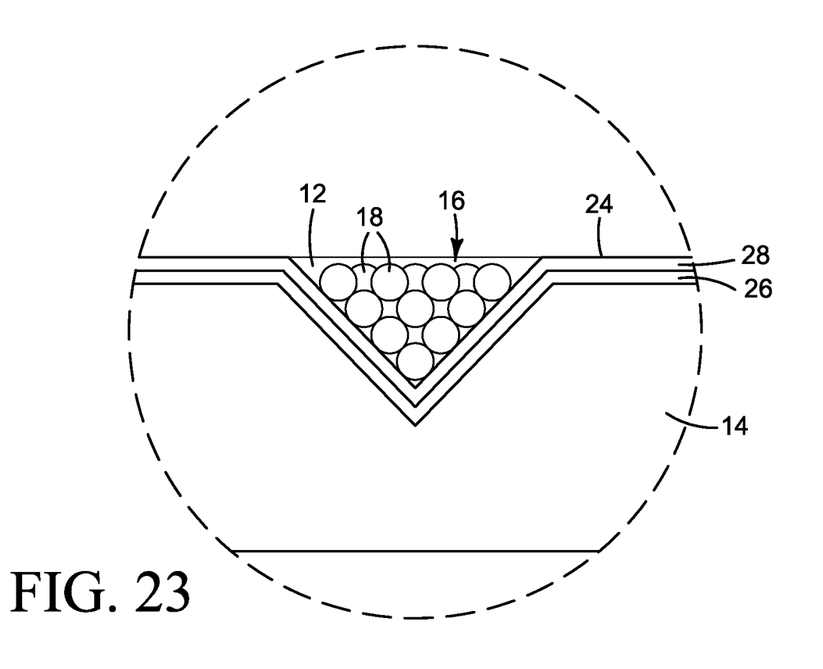
Figure 24:
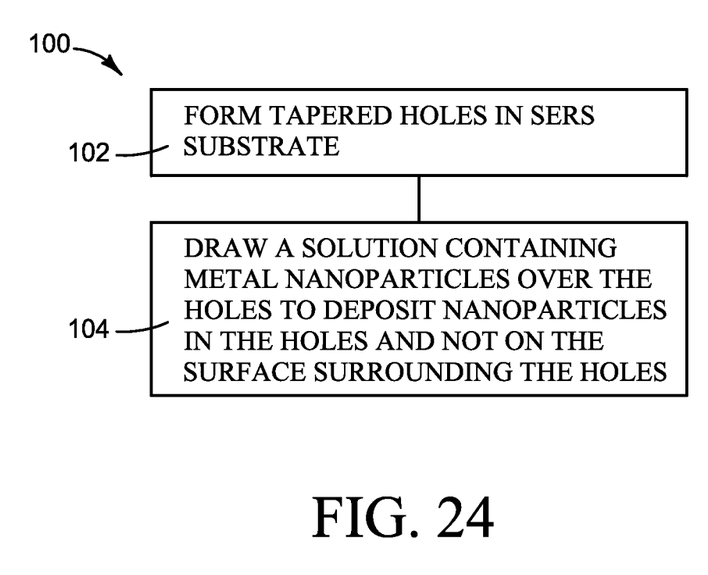
FIG. 24 is a flow diagram illustrating an example fabrication process implemented, for example, in the sequence shown in FIGS. 16-23.

FIGS. 16-23 present a sequence of views illustrating one example of a process for making a SERS nanostructure 10 with three dimensional nanoparticle clusters 16. FIG. 24 is a flow diagram illustrating a fabrication process 100 implemented, for example, in the sequence shown in FIGS. 16-23. Tapered holes 12 are formed in a silicon or other suitable SERS substrate 14 (block 102 in FIG. 24), for example by photolithographic masking and etching techniques that may also be used in semiconductor fabrication. In FIG. 16, substrate 14 is masked (mask 30) in the desired pattern for holes 12. In FIG. 17, substrate 14 is etched to form tapered holes 12. Etch mask 30 is removed in FIG. 18.

Figure 19:
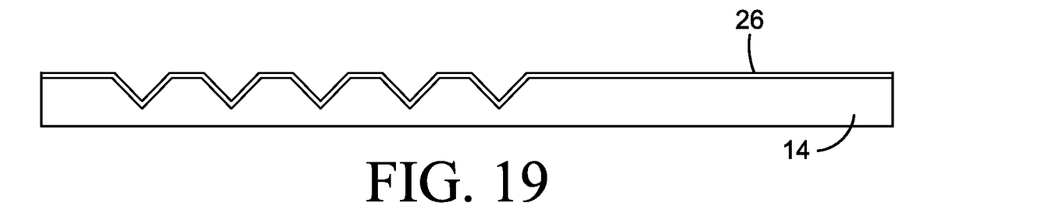
Figure 20:
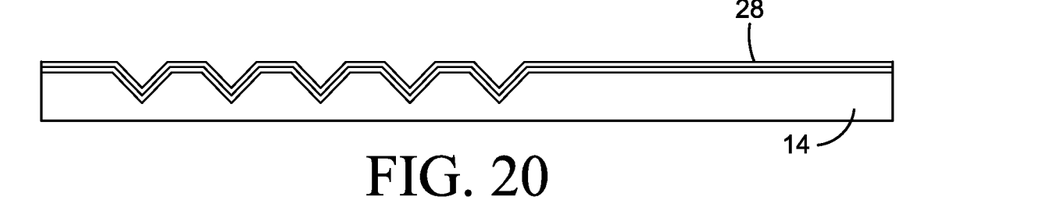

A reflective layer 26 may be formed on substrate 14, as shown in FIG. 19, if desired to improve light scattering (as described above). Reflective layer 26 usually will be gold or another metal and, thus, a dielectric layer 28 may be formed on layer 26 as shown in FIG. 20 to prevent an electrical connection between layer 26 and metal nanoparticles 18.

Figure 21:
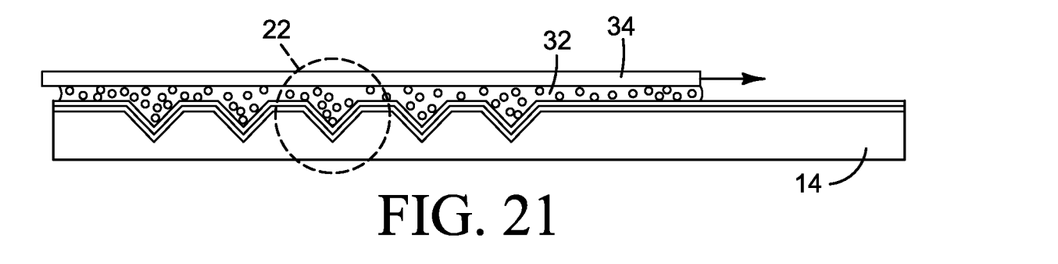

In FIG. 21, nanoparticles 18 are deposited into holes 12 by drawing a solution 32 containing nanoparticles 18 across substrate 14 (block 104 in FIG. 24). FIG. 22 is a detail view from FIG. 21 showing the deposition of nanoparticles 18 into one of the holes 12 in substrate 14. Solution 32 is dispensed on to substrate 14 and a plate 34 placed on substrate 14 to create a thin film of solution 32. By drawing plate 34 slowly across substrate 14, the rate of evaporation of liquid from solution 32 can be controlled so that nanoparticles 18 assemble preferentially in holes 12 and not on surface 24 surrounding the holes. FIG. 23 shows a cluster 16 of nanoparticles 18 in a hole 12 after deposition in FIGS. 21 and 22.

Suitable solvents for depositing metal nanoparticles 18 include, for example, water and ethanol. While the draw rate for plate 34 will vary depending on the type of solvent and other process parameters, for gold nanoparticles 18 dispersed in water it is expected that a draw rate of 1 mm/minute or slower will be adequate to allow nanoparticles 18 to self-assemble into clusters 16 preferentially in holes 12 for the configurations shown in FIGS. 1-15.

As noted at the beginning of this Description, the examples shown in the figures and described above illustrate but do not limit the scope of the patent. Other examples are possible. Therefore, the foregoing description should not be construed to limit the scope of the patent, which is defined in the following Claims.

"A" and "an" as used in the Claims means at least one.

The invention claimed is:

1. A structure for surface enhanced Raman spectroscopy, comprising a cluster of metal nanoparticles in a tapered hole, the cluster including a nanoparticle in a narrower part of the hole and multiple nanoparticles in a broader part of the hole, and where the nanoparticles are clustered in layers with a layer at a narrow part of the hole including a single nanoparticle.

2. The structure of claim 1, where the cluster comprises a two layer cluster of five nanoparticles, a two layer cluster of four nanoparticles, a three layer cluster of ten nanoparticles, and/or a three layer cluster of fourteen nanoparticles.

3. The structure of claim 1, where the cluster includes a top layer of three to ten nanoparticles.

4. The structure of claim 1, where the tapered hole comprises a cone shaped hole and/or a pyramid shaped hole.

5. The structure of claim 1, where the hole is a single hole.

6. The structure of claim 1, where:
the hole is multiple holes; and
the cluster of metal nanoparticles comprises a cluster of metal nanoparticles in each of the holes.

7. The structure of claim 1, comprising a reflective material lining the hole.

8. The structure of claim 7, comprising a dielectric coating the reflective lining to electrically insulate the metal nanoparticles from the reflective lining.

* * * * *